United States Patent
Pan et al.

(10) Patent No.: US 9,804,627 B2
(45) Date of Patent: Oct. 31, 2017

(54) MULTI-INPUT PV INVERTER WITH INDEPENDENT MPPT AND MINIMUM ENERGY STORAGE

(71) Applicants: Shangzhi Pan, Kingston (CA); Majid Pahlevaninezhad, Kingston (CA); Praveen Jain, Kingston (CA)

(72) Inventors: Shangzhi Pan, Kingston (CA); Majid Pahlevaninezhad, Kingston (CA); Praveen Jain, Kingston (CA)

(73) Assignee: SPARQ SYSTEMS INC., Kingston, ON (CA)

(*) Notice: Subject to any disclaimer, the term of this patent is extended or adjusted under 35 U.S.C. 154(b) by 402 days.

(21) Appl. No.: 14/562,429

(22) Filed: Dec. 5, 2014

(65) Prior Publication Data

US 2015/0160676 A1 Jun. 11, 2015

Related U.S. Application Data

(60) Provisional application No. 61/912,928, filed on Dec. 6, 2013.

(51) Int. Cl.

| | |
|---|---|
| *H02J 1/00* | (2006.01) |
| *H02J 3/00* | (2006.01) |
| *G05F 1/67* | (2006.01) |
| *H02M 3/337* | (2006.01) |
| *H02J 3/38* | (2006.01) |

(52) U.S. Cl.
CPC ............ *G05F 1/67* (2013.01); *H02J 3/385* (2013.01); *H02M 3/3376* (2013.01); *Y02E 10/58* (2013.01); *Y10T 307/707* (2015.04)

(58) Field of Classification Search
CPC ......... G05F 1/67; H02J 3/385; H02M 3/3376; Y02E 10/58; Y10T 307/707
USPC .......................................................... 307/82
See application file for complete search history.

(56) References Cited

U.S. PATENT DOCUMENTS

| | | | |
|---|---|---|---|
| 2004/0125618 A1* | 7/2004 | De Rooij | H02J 1/102 363/17 |
| 2005/0105224 A1* | 5/2005 | Nishi | H02M 3/285 361/18 |
| 2011/0188276 A1* | 8/2011 | Schill | H02J 3/383 363/131 |
| 2012/0098346 A1* | 4/2012 | Garrity | H02J 3/383 307/82 |
| 2015/0048854 A1* | 2/2015 | Fornage | H02S 50/00 324/713 |

* cited by examiner

*Primary Examiner* — Hal Kaplan
*Assistant Examiner* — Toan Vu
(74) *Attorney, Agent, or Firm* — Brion Raffoul

(57) ABSTRACT

Systems, methods, and devices relating to the use of multiple DC power generation sources with DC/DC converters to thereby provide AC power suitable for provision to a power grid. Multiple DC power generation sources are each coupled to an input stage with a DC/DC converter. All the DC/DC converters in the multiple input stages are controlled by a single digital controller. Within the single digital controller are controller sub-blocks, each of which generates control signals for a specific DC/DC converter. Each controller sub-block provides multiple functions for improving the performance of the system as a whole.

18 Claims, 13 Drawing Sheets

MULTI-INPUT PV INVERTER WITH INDEPENDENT MPPT AND MINIMUM ENERGY STORAGE

RELATED APPLICATIONS

This application is a non-provisional application which claims the benefit of U.S. Provisional Patent Application No. 61/912,928 filed on Dec. 6, 2013.

TECHNICAL FIELD

The present invention relates to systems, methods, and devices relating to converting power from DC power generation sources to AC power for use in a power grid. More specifically, the present invention relates to using multiple DC power generation sources to produce AC power using a single controller for multiple DC/DC converters with maximum power point tracking.

BACKGROUND OF THE INVENTION

There is a growing number of photovoltaic (PV) applications where direct current/alternating current (DC/AC) inverters are required to provide independent maximum power point tracking (MPPT) at multiple inputs to harvest maximum solar energy from PV panels and to thereby feed clean AC electricity into the power grid. FIG. 1 is a circuit diagram of such an inverter using conventional technology. As can be seen, multiple power generators are independently coupled to DC/DC converters. Each combination of power generator, DC/DC converter, energy storage, and DC/AC converter is controlled by a specific digital controller. Unfortunately, this configuration is not only expensive but also quite complex, large, and heavy. Installation and maintenance would therefore come at a fairly high cost and inconvenience.

Based on the above, there is therefore a need for systems and devices which mitigate if not avoid the shortcomings of the prior art.

SUMMARY OF INVENTION

The present invention provides systems, methods, and devices relating to the use of multiple DC power generation sources with DC/DC converters to thereby provide AC power suitable for provision to a power grid. Multiple DC power generation sources are each coupled to an input stage with a DC/DC converter. All the DC/DC converters in the multiple input stages are controlled by a single digital controller. Within the single digital controller are controller sub-blocks, each of which generates control signals for a specific DC/DC converter. Each controller sub-block provides multiple functions for improving the performance of the system as a whole.

In a first aspect, the present invention provides a system for converting DC power from multiple DC power generation sources to AC power for use in a power grid, the system comprising:
  multiple input stages, each input stage receiving DC power from a DC power source;
  an energy storage and combiner block, outputs of each of said multiple input stages being received by said energy storage and combiner block, outputs of each input stage being stored and combined by said energy storage and combiner block;
  a DC/AC converter block, an output of said energy storage and combiner block being received by said DC/AC converter block;
  a single digital controller block for producing control signals for each of said input stages and control signals for said DC/AC converter block;
  wherein
  an energy output of said DC/AC converter block is transferred to said power grid.

In a second aspect, the present invention provides a DC/DC converter circuit comprising:
  a DC capacitor coupled between input nodes from a DC power generation source;
  a bridge inverter coupled to said DC capacitor;
  a resonant tank circuit coupled to said inverter;
  an isolating transformer coupled to said resonant tank circuit;
  a rectifier circuit coupled to said transformer;
  wherein
  said bridge inverter comprises at least two switches, each of said at least two switches being controlled by signals received from a single digital controller block.

In a third aspect, the present invention provides a controller for use in controlling a DC/DC converter, the controller comprising:
  a maximum power point tracking (MPPT) module receiving current and voltage data from said DC/DC converter, said MPPT module producing a reference voltage signal;
  a digital compensator module receiving said reference voltage signal and an optimal duty cycle signal, said digital compensator module producing a duty cycle signal;
  a frequency control module receiving:
    a power signal from said MPPT module for said DC/DC converter,
    said duty cycle signal, and
    said voltage data for said DC/DC converter,
    said frequency control module producing an optimum frequency signal and said optimal duty cycle signal for said DC/DC converter;
  a digital pulse width modulation (PWM) module receiving:
    said duty cycle signal,
    said optimum frequency signal, and
    an optimum phase signal;
    said PWM module producing said control signals for said DC/DC converter;
  wherein
  said optimum phase signal is produced by a phase coordinator module which determines an optimum phase for said DC/DC converter based on:
    said power signal for said DC/DC converter and
    said optimum frequency signal for said DC/DC converter.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
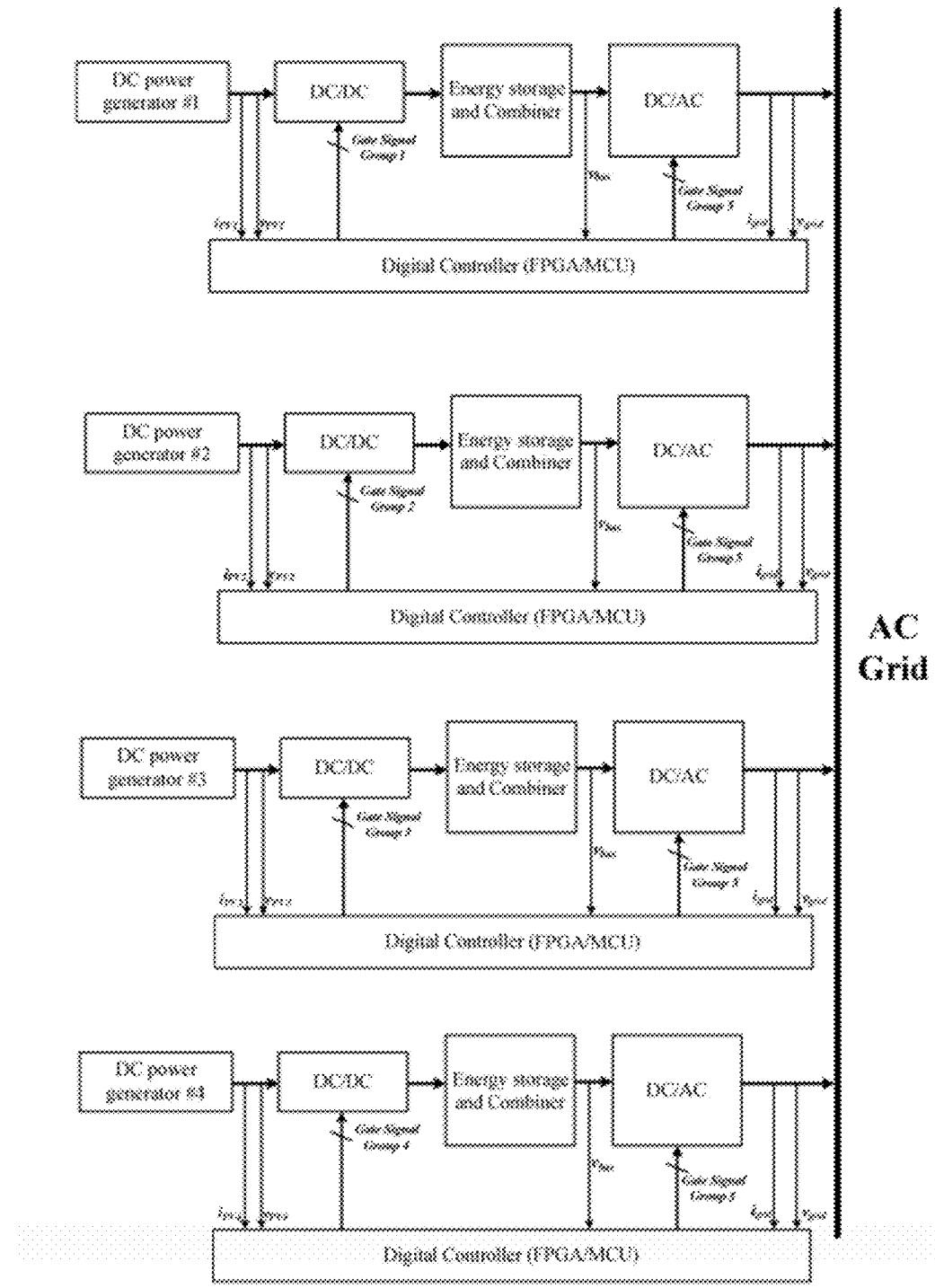
FIG. 1 is a block diagram of a system according to the prior art.
Figure 2:
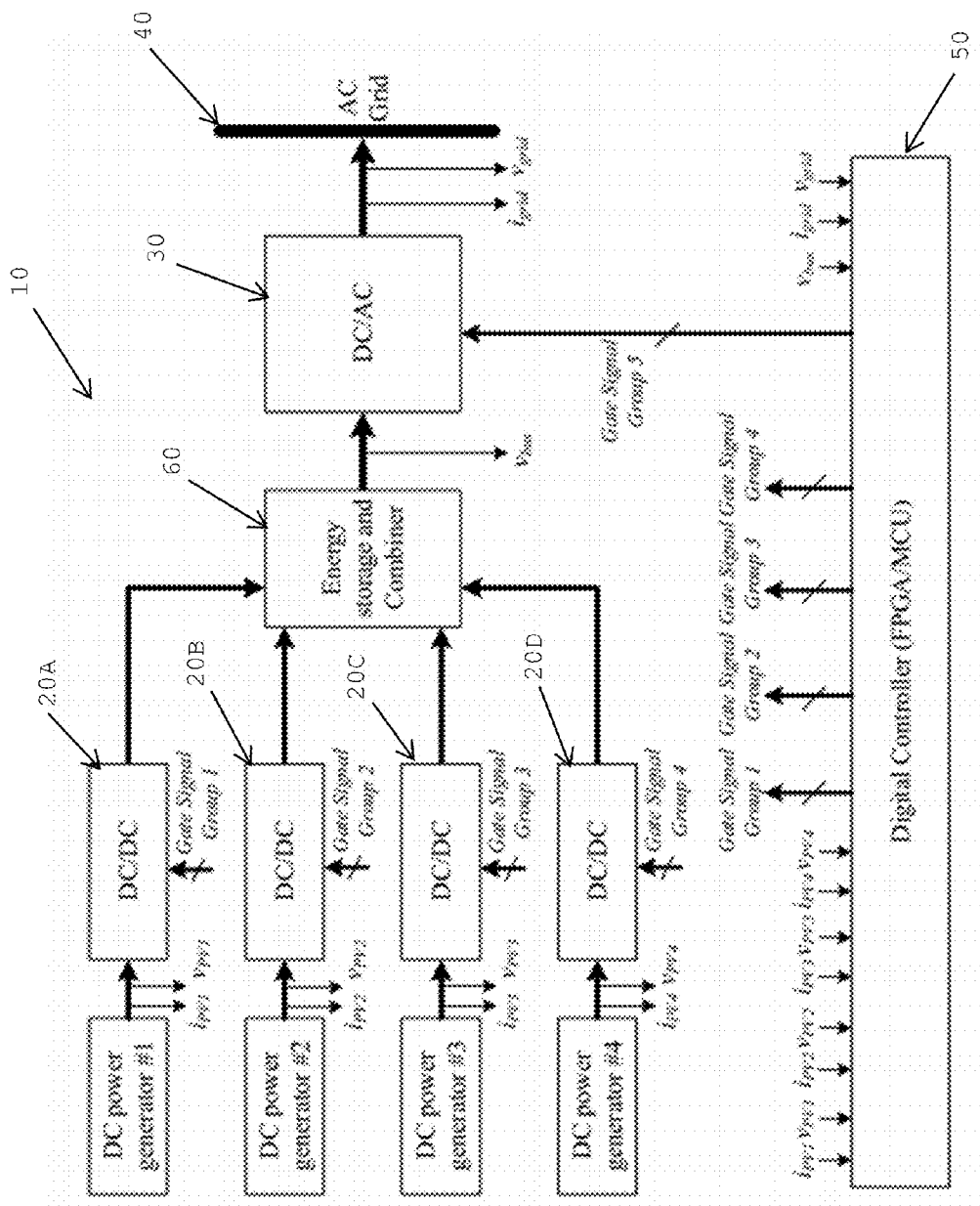
FIG. 2 is a block diagram of a system according to one aspect of the invention.

Referring to FIG. 2, a block diagram of a system according to one aspect of the invention is illustrated. The system in FIG. 2 is that of a novel inverter topology for use with one or multiple power sources. The system 10 has four input stages (DC/DC) 20A, 20B, 20C, and 20D, and one output stage (DC/AC) 30. The output stage 30 injects power into an AC power grid 40. All the input stages 20A-20D, as well as the DC/AC output stage 30 are controlled by a central digital controller 50. An energy storage and combiner block 60 that stores and combines the outputs of the multiple stages 20A-20D before combining them for transfer to the DC/AC output stage 30.

In the system in FIG. 2, each one of the multiple input stages is independent of one another. Each input stage is fed by a DC power generator, such as a PV module. The input stage processes power and converts it into a desired form. The energy storage and combiner combines all energy from four input stages, creating an intermediate DC bus. A DC/AC inverter is connected to the intermediate DC bus, which converts the DC power into AC form and injects the AC current into the AC grid. The energy storage and combiner also works as energy decoupling between DC power and AC power. A digital controller collects all input voltage and current information from all multiple inputs, intermediate DC bus voltage information, and grid current and voltage information. The digital controller processes a control method with collected input and output information, and then generates different gate signals for all multiple input stages and for the DC/AC inverter. As can be seen from FIG. 2, each input stage in the system 10 consists of a DC/DC converter. Other configurations with other components are, of course, possible.

From FIG. 2, it should be clear that the digital controller receives the current and voltage value signals from the various DC power generation sources. As well, the digital controller receives the DC bus voltage from the energy storage and combiner block. The grid current and the grid voltage are also received from the DC/AC block. The digital controller 50 produces control signals for each one of the input stages 20A-20D as well as for the DC/AC block 30.

While FIG. 2 illustrates four input stages, other configurations with differing numbers of input stages, are also possible.

Figure 3:
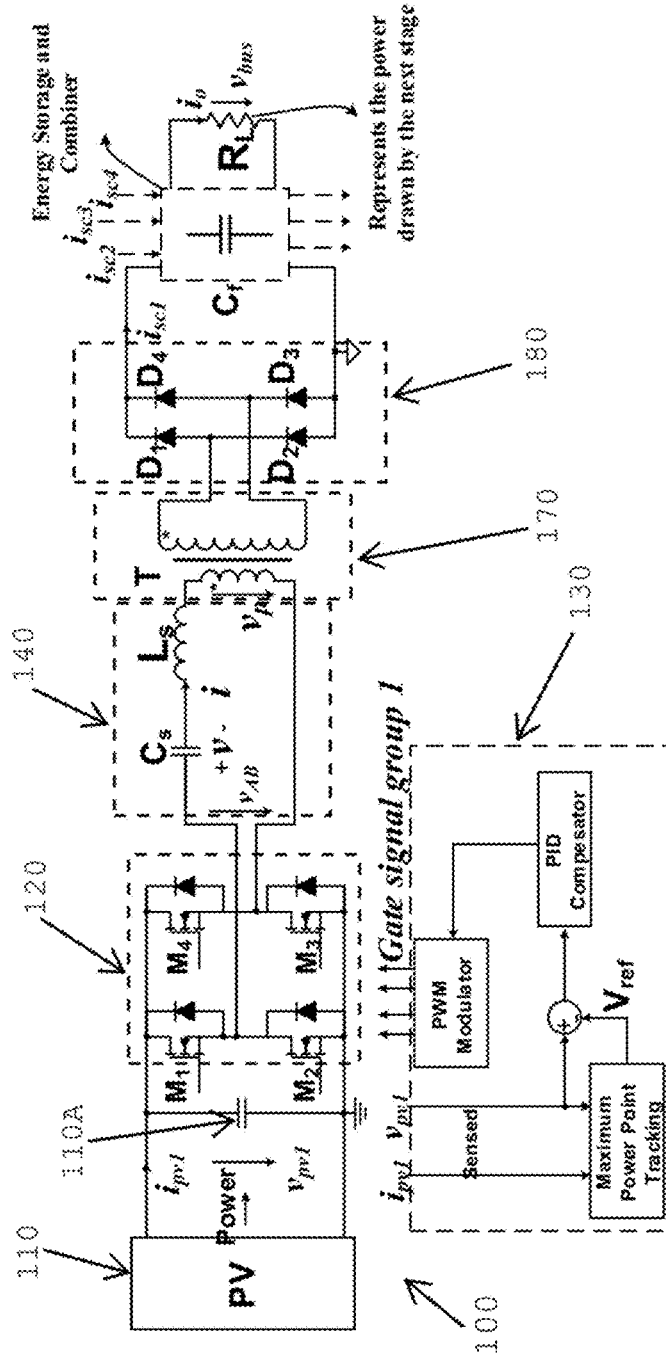
FIG. 3 is a diagram of a DC/DC converter according to another aspect of the invention.

Referring to FIG. 3, a diagram of a DC/DC converter configuration used with one implementation of the invention is illustrated. As can be seen, the DC/DC converter 100 is fed by a PV module 110. A DC capacitor 110A is coupled between the two input points for the PV module 110. The DC capacitor 110A is coupled to an inverter 120, with multiple switches, whose control signals are received from a controller 130. The controller 130 receives the current and voltage of the power from the PV module 110 and, based on these inputs, provides suitable control signals for the semiconductors in the inverter 120. Coupled to the inverter 120 is a resonant tank circuit 140. In this implementation, the resonant tank circuit 140 is an LC circuit with a capacitor 150 and an inductor 160 coupled in series to each other. Coupled to the resonant tank circuit 140 is a transformer 170. The transformer 170 is then coupled to a rectifier circuit 180. The output of the rectifier circuit 180 (a diode rectifier circuit in this implementation) is then fed into the energy storage and combiner block.

The function of each component within the DC/DC converter is clear. The DC/DC converter has a DC capacitor connected across the high side and low side input points from the PV module, a voltage inverter such as full bridge inverter (or a half-bridge inverter), a resonant tank, an isolating transformer, and a rectifier circuit. The voltage inverter converts the voltage on the DC capacitor into a high frequency AC voltage while rejecting the voltage oscillations caused by the instantaneous output power oscillation originating from the AC grid. The resonant tank converts the high frequency AC voltage into a substantially sinusoidal AC voltage or current. The transformer provides galvanic isolation and voltage boost. The rectifier circuit turns the high frequency substantially sinusoidal current into a rectified sinusoidal DC current.

Once the sinusoidal DC current has been produced, this rectified high frequency sinusoidal currents from each of the various input stages is injected into an energy storage capacitor within the energy storage and combiner block to produce an intermediate DC voltage bus. The intermediate DC voltage is then converted into line frequency sinusoidal current, by the DC/AC output stage, and is fed to the AC power grid. The control method employed in the digital controller minimizes the amount of energy storage capacitor to a minimum value such that the intermediate bus voltage has substantial double grid frequency ripple. The negative effect of this ripple voltage on the harmonics of grid current can be mitigated by the pulse-width modulation (PWM) control techniques employed in the design of DC/AC inverter in the DC/AC block.

Figure 4:
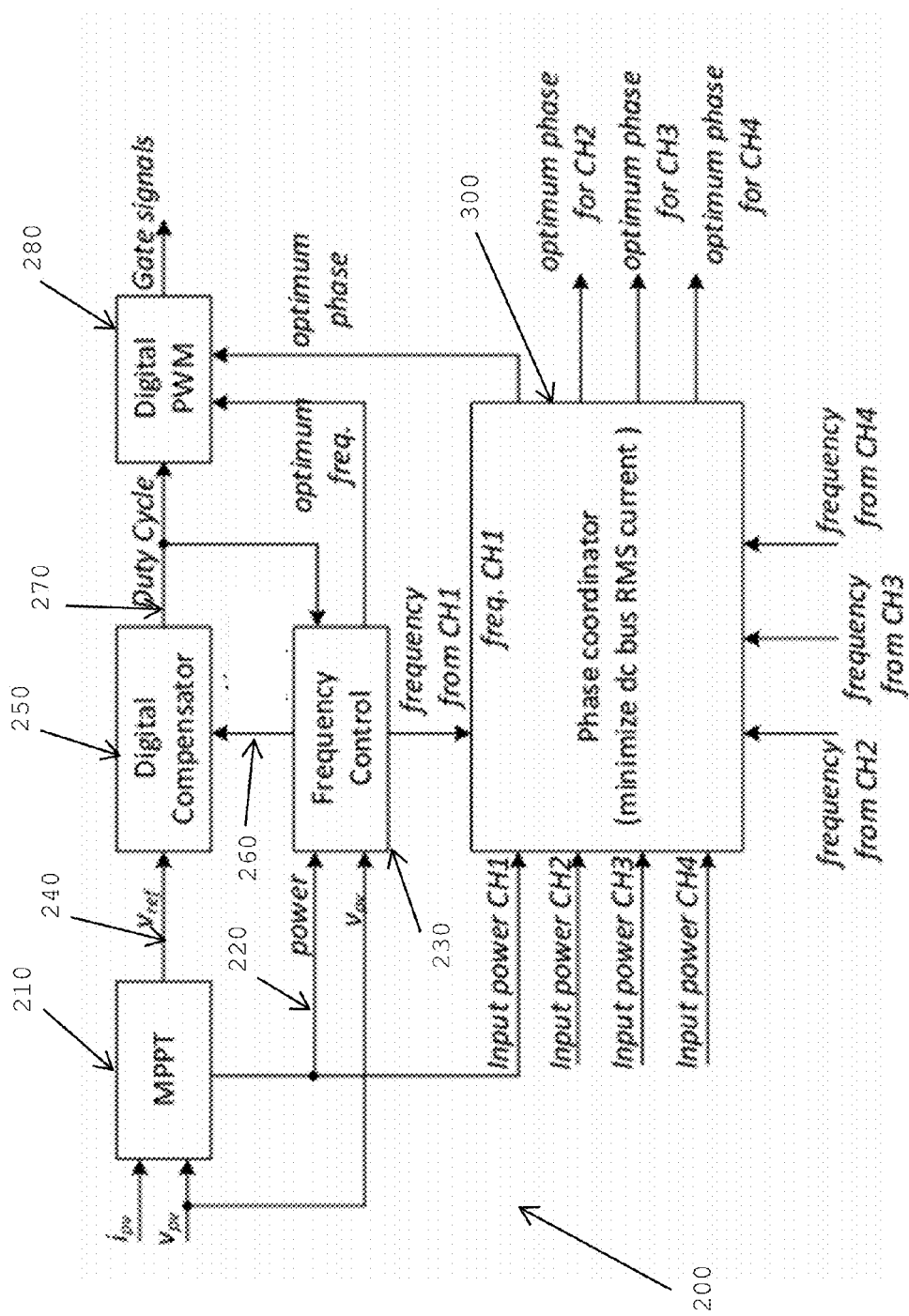
FIG. 4 is a a diagram of a sub-block used in the digital controller according to one aspect of the invention.

Referring to FIG. 4, a block diagram of a sub-block within the digital controller 50 is illustrated. The use of this sub-block within the single digital controller provides the following functions simultaneously:

Independent control of MPPT for each multiple input source.

Low-frequency ripple rejection from each multiple input source.

High frequency near loss-less switching of each input DC/DC converter.

Optimum phase sequencing of each input DC/DC converter to minimize the high frequency ripple from the DC bus.

Minimization of the DC bus capacitor.

Generation of modified PWM signals to mitigate the non-characteristics harmonics from the grid current that may otherwise be produced due to the low value of the DC bus capacitor.

Soft-inrush current control of the grid current.

Non-islanding operation of the inverter system.

Active power control at the grid.

Reactive power control at the grid.

Communications with the user(s).

Referring to FIG. 4, the sub-block 200 controls a specific DC/DC converter in a specific input stage of the system 10. A maximum power point tracking (MPPT) module 210 receives the current and voltage values for the PV module (or the DC power generation source). The MPPT module produces a power signal 220 that is received, along with the voltage value for the PV module, to a frequency control module 230. The MPPT module 210 also produces reference voltage signal 240 that is received by a digital compensator module 250. This digital compensator module 250 receives an optimal duty cycle signal 260 from the frequency control module 230 and produces a duty cycle signal 270. The duty cycle signal 270 is fed to the frequency control module 230 as well as to a digital pulse width modulation (PWM) module 280. This PWM module 280 receives an optimum phase signal 290 from a phase coordinator module 300 and an optimal frequency signal 310 from the frequency control module 230. Based on these inputs, the PWM module 280 produces control signals for the specific DC/DC converter in an input stage. The phase coordinator module 300 coordinates the various phases of the various input stages. The phase coordinator module 300 receives the power signal 220 from the various MPPT modules of the different DC/DC converters as well as the optimum frequency signal from the various frequency control modules of the different DC/DC converters. This phase coordinator module 300 produces the optimum phases for the various DC/DC converters to thereby minimize DC bus RMS current.

The control technique used in the present invention optimizes the switching frequency as well as the duty-cycle of the multiple DC/DC converters in order to achieve minimum power losses and zero voltage switching. The optimization method is used to determine the optimal frequency value, $f_{sw}^{opt}$, and the optimal duty-cycle, $\delta^{opt}$, for each DC/DC converter in order to minimize the RMS (Root-Mean-Square) value of the series resonant current.

The gain of the series resonant converter is given by:

$$\frac{v_{p1}}{v_{AB1}} = \frac{R_e C_s s}{L_s C_s s^2 + R_e C_s s + 1} \quad (1)$$

where $R_e$ is the equivalent resistance viewed from the transformer primary winding, $C_s$ is the series capacitance, and $L_s$ is the series inductance. Therefore the total gain is derived as:

$$v_{p1} = \left|\frac{4}{\pi} V_{PV} \sin\frac{\delta}{2}\right| \cdot \left|\frac{j\frac{\omega_n}{Q}}{j\frac{\omega_n}{Q} + (1 - \omega_n^2)}\right| \sin(\omega_s t) \quad (2)$$

Figure 5:
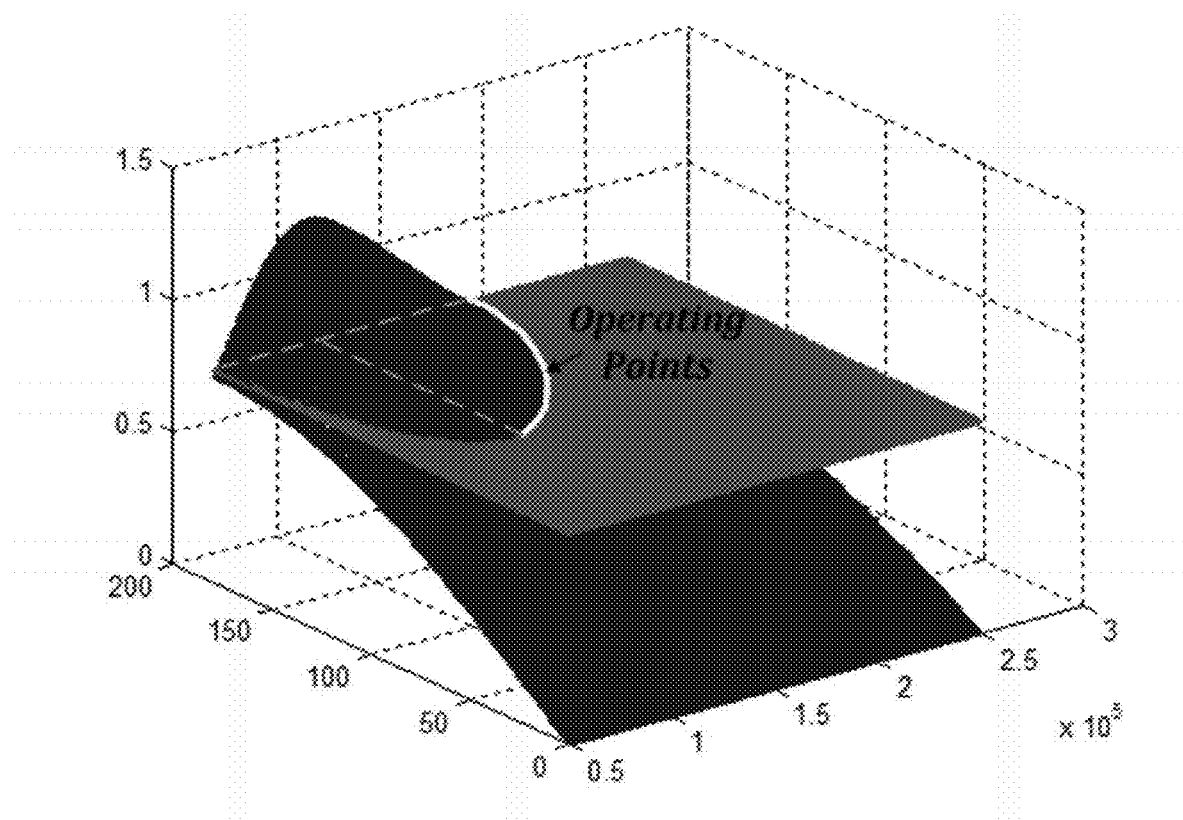
FIG. 5 is a diagram showing the intersection of the desire gain and the possible operating points of the system.

The intersection of the desired gain and Eqn. (2) determines the possible operating points of the converter. FIG. 5 shows this intersection. According to FIG. 5, multiple possible operating points with different values of frequencies and duty-cycles can achieve the same gain. Out of all these points, the point that has the minimum amount of series resonant RMS current is the optimum operating point. The series resonant current, i, is derived as:

$$\frac{i_1}{v_{AB1}} = \frac{C_s s}{L_s C_s s^2 + R_e C_s s + 1} \quad (3)$$

Therefore, the series resonant RMS current is given by:

$$i_1^{RMS}(\omega_n, \psi) = \frac{1}{\sqrt{2}} \left|\frac{4}{\pi} V_{PV} \sin\frac{\delta}{2}\right| \cdot \left|\frac{j\frac{\omega_n}{QR_e}}{j\frac{\omega_n}{Q} + (1 - \omega_n^2)}\right| \quad (4)$$

The optimum point is derived by the following equation:

$$\frac{\partial i_1^{RMS}(\omega_n, \delta)}{\partial \omega_n} = 0 \quad (5\text{-}1)$$

$$\text{and } \frac{\partial i_1^{RMS}(\omega_n, \delta)}{\partial \delta} = 0 \quad (5\text{-}2)$$

Eqs. (5-1) and (5-2) are equivalent to maximum duty-cycle and minimum switching frequency. Also, in order to have zero voltage switching, the series resonant current angle should be equal to the angle of rising edge of the bridge voltage, $v_{AB}$. Therefore, optimal zero voltage switching is guaranteed by the following condition:

$$\frac{\delta}{2} \approx \tan^{-1}\left(\frac{1}{Q} \cdot \frac{\omega_n}{1 - \omega_n^2}\right) \quad (6)$$

Figure 6:
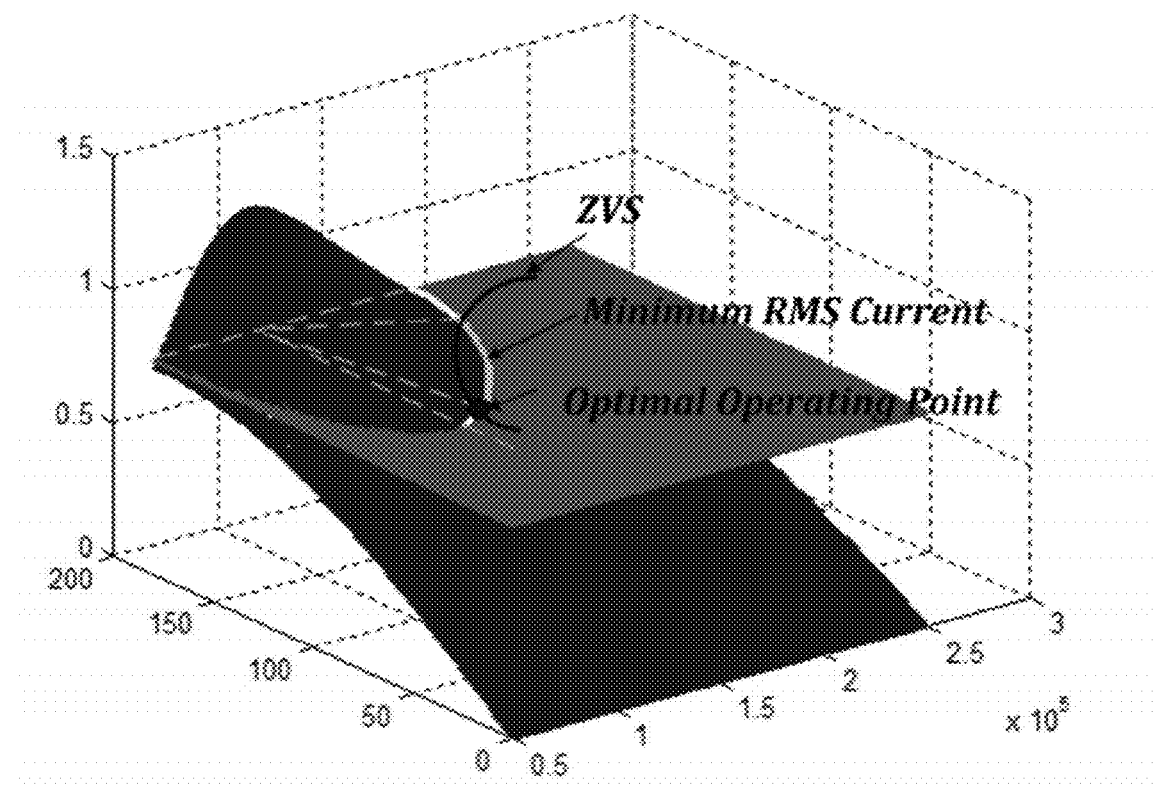
FIG. 6 illustrates the optimal operating point for the system.

The intersection of the above conditions determines the optimal operating point. FIG. 6 shows the optimal operating point of the series resonant converter.

Figure 7:
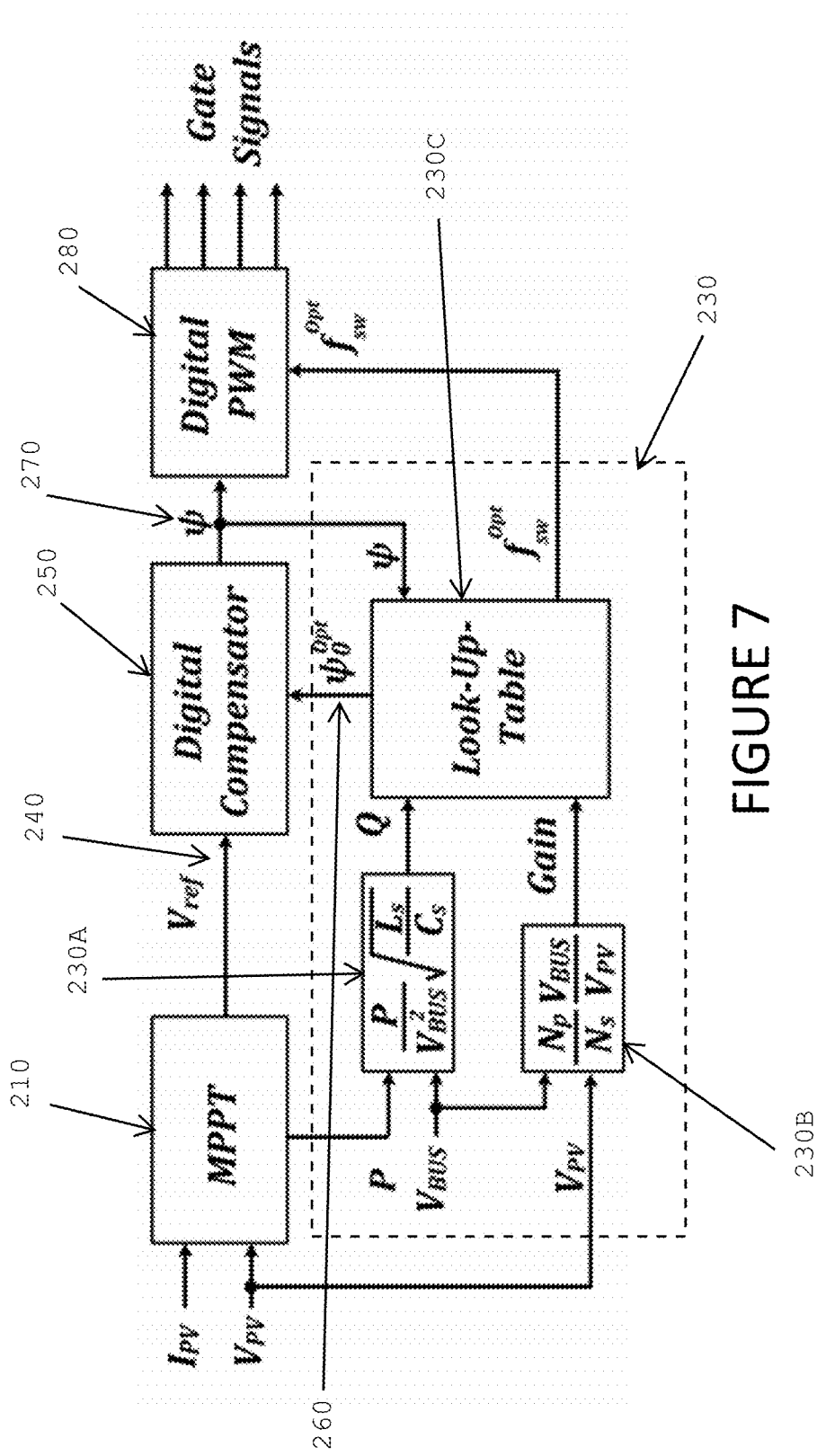
FIG. 7 is a block diagram of a frequency control module according to another aspect of the invention.

Referring to FIG. 7, a block diagram of a frequency control module according to another aspect of the invention is illustrated. This frequency control module performs an optimal frequency calculation. The frequency control module 230 has a first calculation block 230A and a second calculation block 230B. The first calculation block 230A calculates the Q factor based on the power signal from the MPPT module and the bus voltage while the second calculation block 230B calculates the gain based on the bus voltage and the PV module voltage. A look-up table block 230C determines the proper optimal frequency and duty cycle based on the values for the Q factor and the gain. The look-up table block 230C would, based on the inputs, perform a look-up operation on a table of optimal frequency and duty cycle values and output these values. As shown in FIG. 2, the bus voltage is received from the energy storage and combiner block.

In FIG. 7, the optimal value of frequency, $f_{sw}^{opt}$, and duty-cycle, $\delta_0^{opt}$, are produced based on the required gain and the quality factor through a look-up table. This look-up table implements the curve derived from an optimization of the system based on the curves shown in FIGS. 5 and 6. The initial value of the duty-cycle is given to the digital compensator module 250 and the digital compensator module 250 modifies this value in order to achieve the precise gain value by way of a feedback loop. Then the optimized value of the switching frequency is determined using the duty-cycle value.

It should be noted that the look-up table block 230C may be replaced by a mathematical block which, instead of performing a look-up operation to find the optimum frequency and duty cycles, calculates these optimal frequency and duty cycle values based on the inputs. Of course, such a mathematical block would have the same inputs and outputs as the look-up table block 230C.

Figure 8:
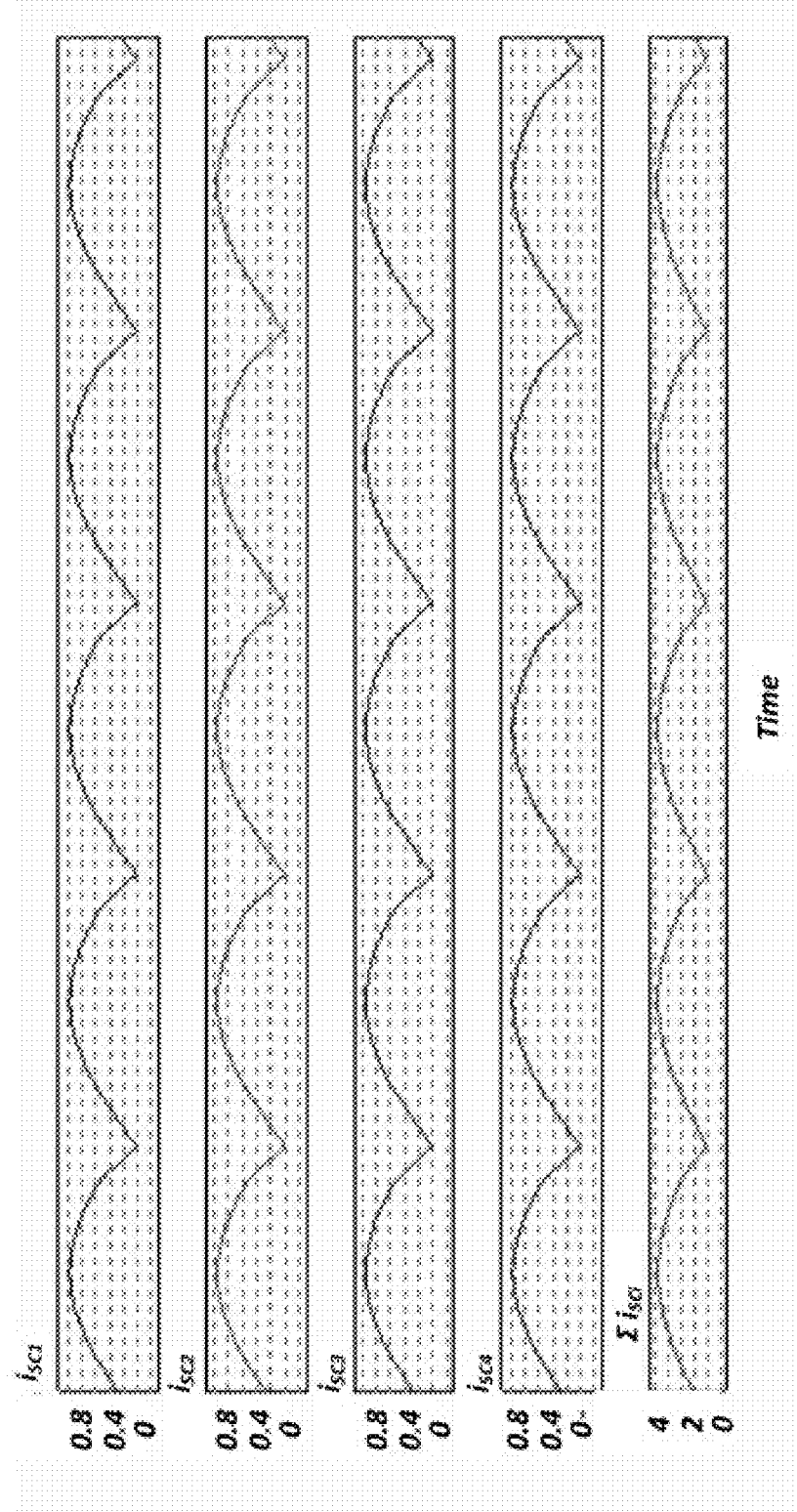
FIG. 8 illustrates simulation results for the system when there is no phase coordination between the various input stages.
Figure 9:
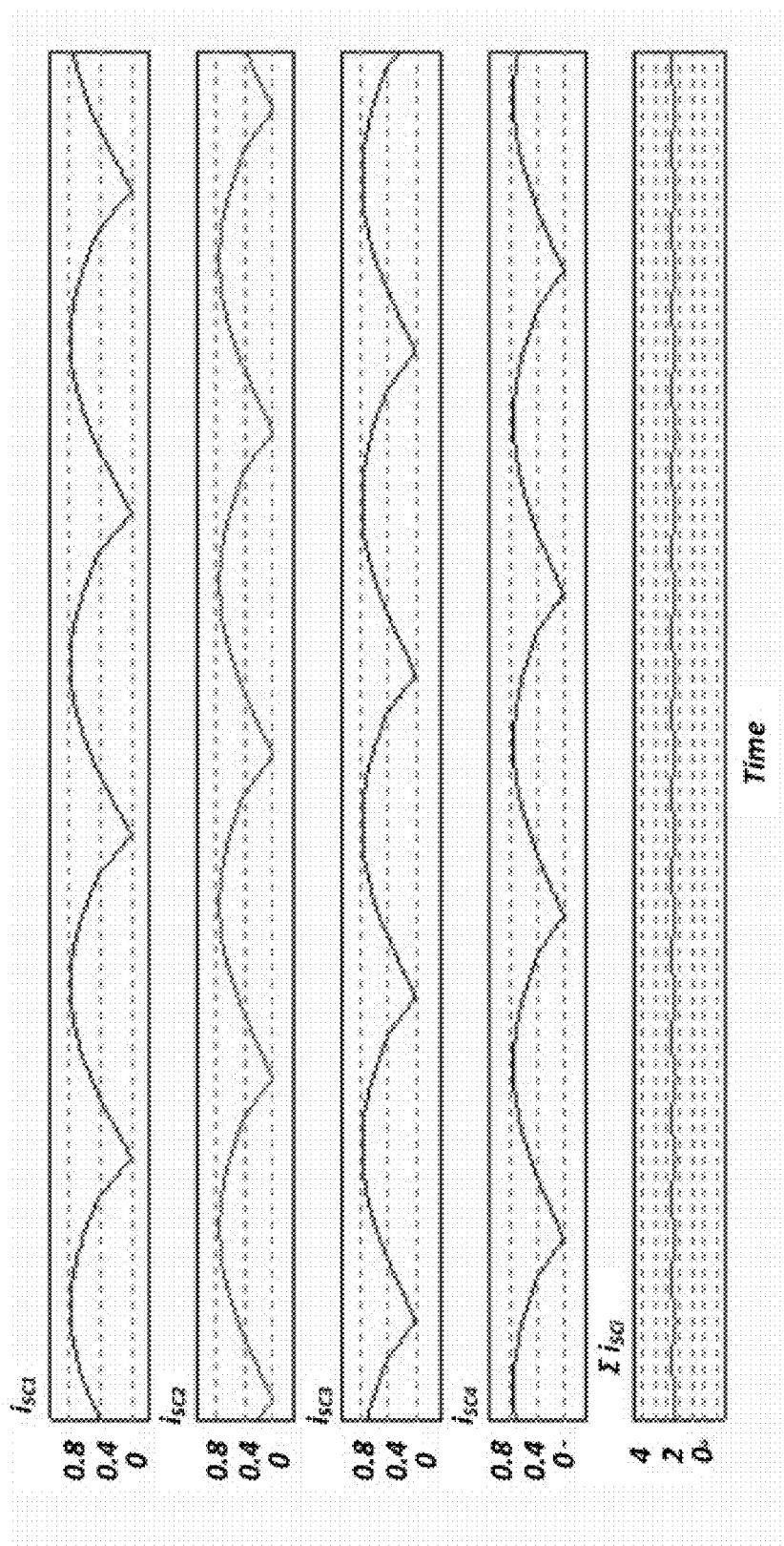
FIG. 9 illustrate simulation results for when phase coordination is implemented in the same system as in FIG. 8.

FIG. 8 shows the simulation results of the multi-input system when the bridge voltages for four channels (i.e. the four input stages) are applied at the same time (no phase coordination). According to FIG. 8, the current ripple flowing through the DC-bus capacitor is very large in this case. FIG. 9 shows the same simulation results when the phase coordinator is implemented in the control system. This figure shows that the current ripple flowing through the capacitor is significantly reduced.

Figure 10:
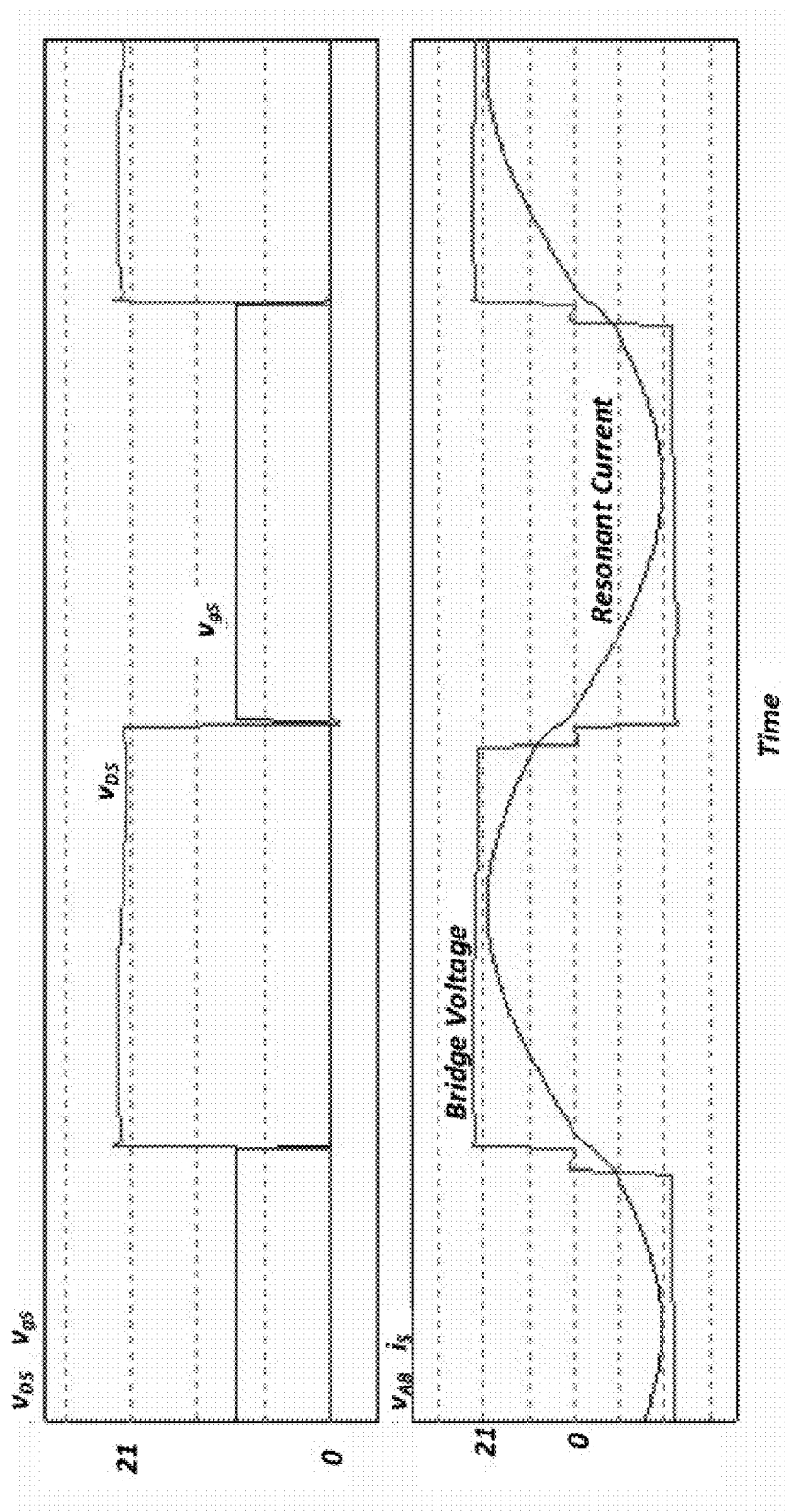
FIGS. 10 and 11 show the zero voltage switching and non-zero voltage switching of the series resonant converter for two different sets of switching frequency and duty-cycle values.
Figure 11:
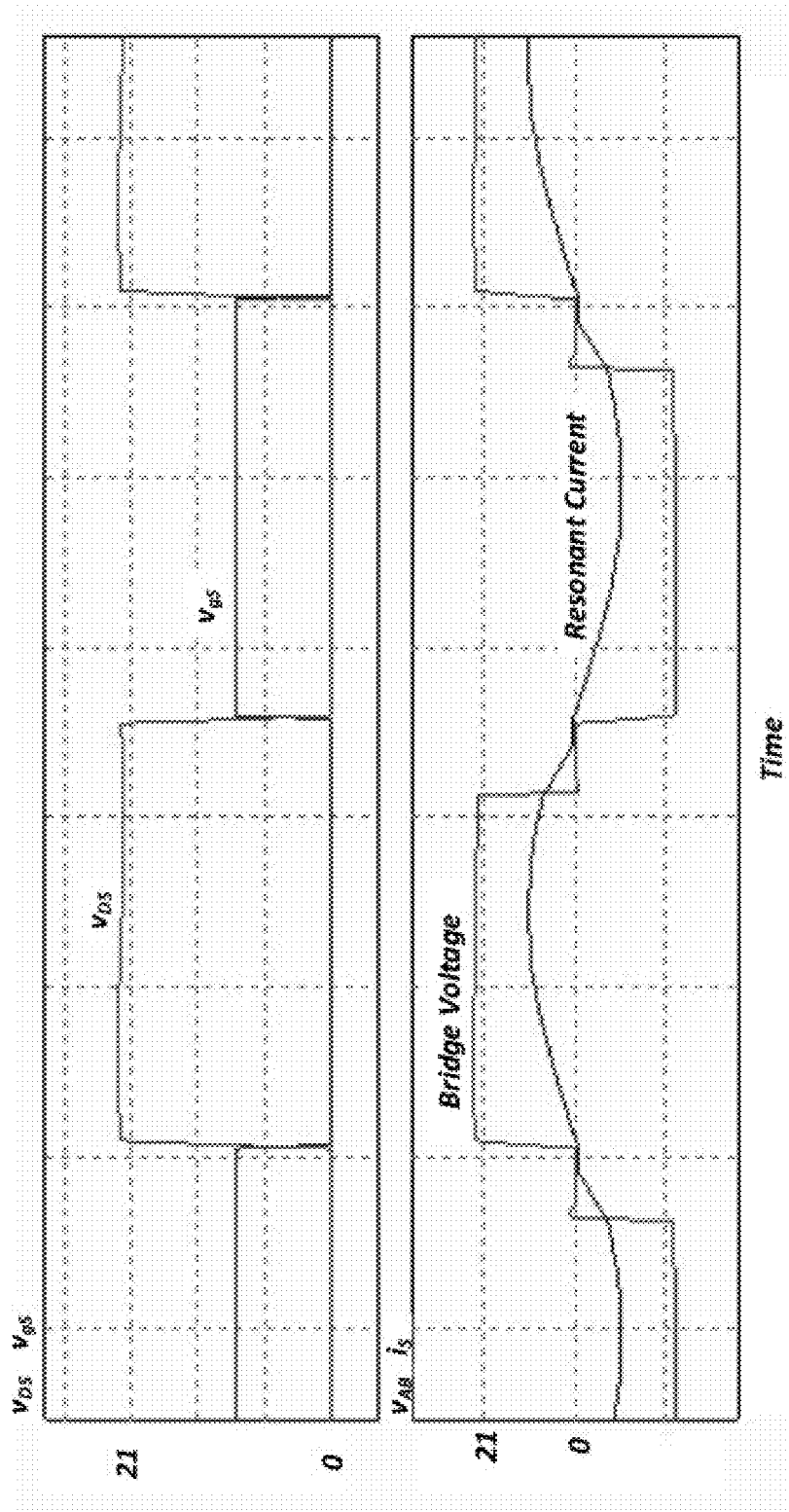

FIG. 10 and FIG. 11 show the zero voltage switching and non-zero voltage switching of the series resonant converter for two different sets of switching frequency and duty-cycle values. In FIG. 10, the series resonant current is lagging the rising edge of the bridge voltage. Thus, zero voltage switching is realized for this condition. In contrast, in FIG. 11, the series resonant current zero-crossings are not within the voltage pulses. For the condition illustrated in FIG. 11, ZVS is lost. FIG. 10 and FIG. 11 confirm that there can be two sets of switching frequency and duty-cycle values for the same operating condition (same gain and same load). However, zero voltage switching is realized for only one of these conditions.

Figure 12:
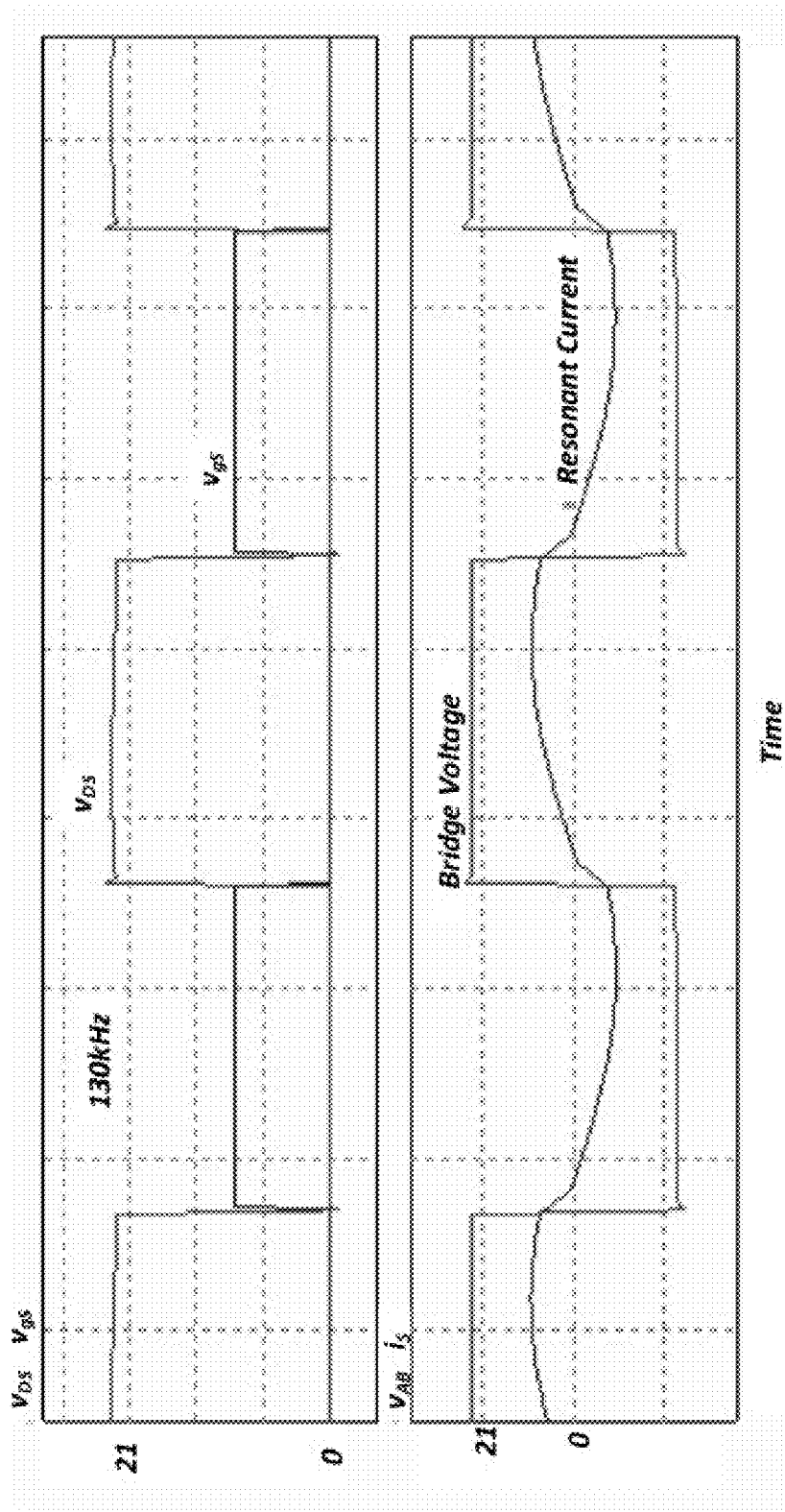
FIGS. 12 and 13 are simulation results of the series resonant converter for the same condition with two different sets of switching frequency and duty-cycle values.
Figure 13:
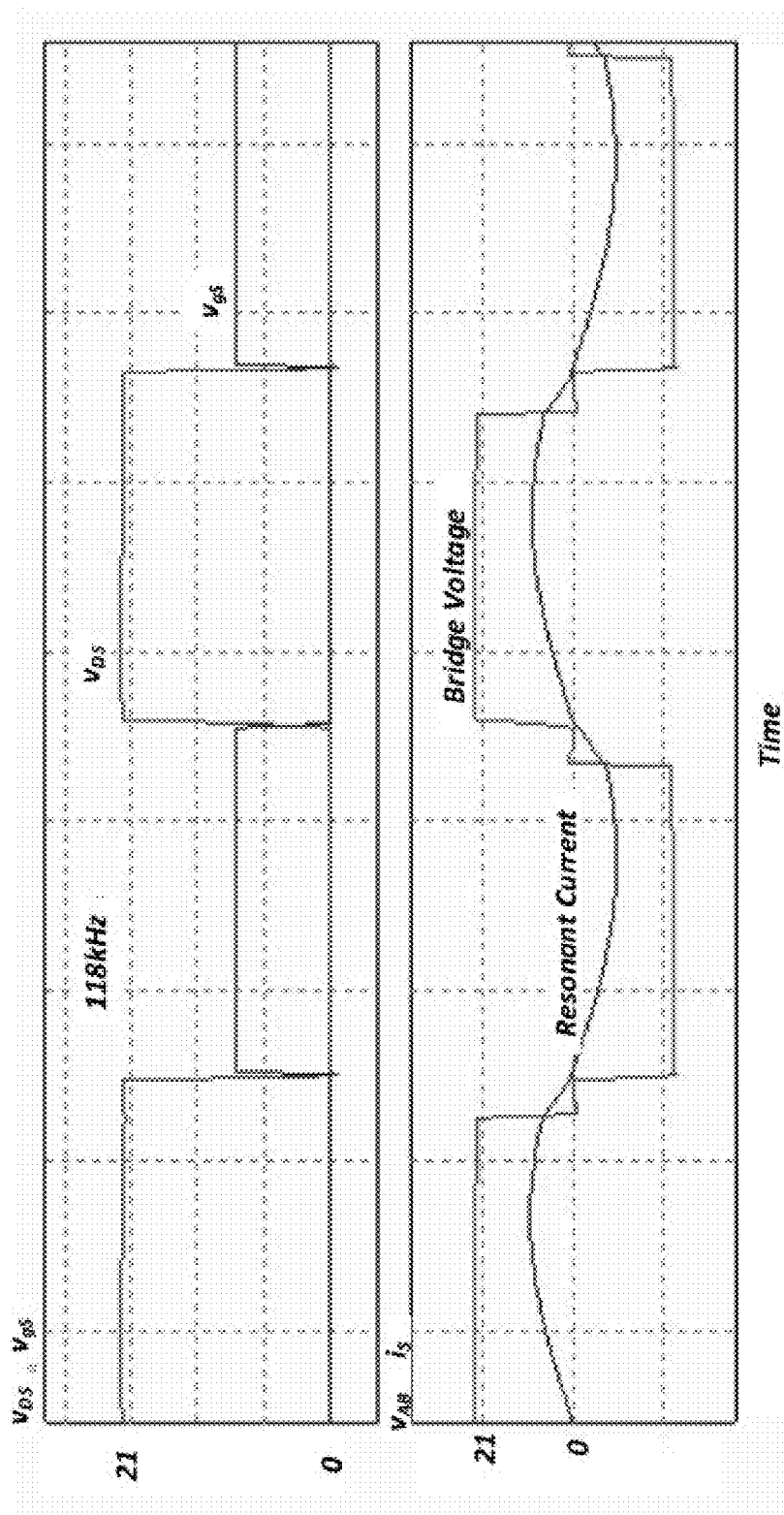

FIG. 12 and FIG. 13 show the simulation results of the series resonant converter for the same condition with two different sets of switching frequency and duty-cycle values. FIG. 12 illustrates an almost full-duty ratio and higher switching frequency compared to the results in FIG. 13. FIG. 12 shows that the series resonant current angle is very far from the angle of rising edge of the bridge voltage, leading to the non-optimized operation of the converter. However, according to the results shown in FIG. 13, the optimization method modifies the switching frequency and the duty-cycle in order to achieve optimum operation.

It should be noted that the digital controller can be implemented as an FPGA (fixed pin grid array) or as a suitably programmed microcontroller unit. The control method can therefore be implemented as a series of computer instructions which determine the required control signals based on the values sensed by the system.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for converting DC power from multiple DC power generation sources to AC power for use in a power grid, the system comprising:
   multiple input stages, each input stage receiving DC power from a DC power source;
   an energy storage and combiner block, outputs of each of said multiple input stages being received by said energy storage and combiner block, outputs of each input stage being stored and combined by said energy storage and combiner block;
   a DC/AC converter block, an output of said energy storage and combiner block being received by said DC/AC converter block;
   a single digital controller block for producing control signals for each of said input stages and control signals for said DC/AC converter block;
   wherein
   an energy output of said DC/AC converter block is transferred to said power grid;
   each of said multiple input stages comprises a DC/DC converter receiving input from a specific DC power generation source, each of said multiple input stages being coupled with said energy storage and combiner block;
   each DC/DC converter is controlled by a controller sub-block, each controller sub-block comprising:

a maximum power point tracking (MPPT) module receiving current and voltage data from a specific DC power generation source, said MPPT module producing a reference voltage signal;

a digital compensator module receiving said reference voltage signal and an optimal duty cycle signal, said digital compensator module producing a duty cycle signal;

a frequency control module receiving:
  a power signal from said MPPT module for said DC power generation source,
  said duty cycle signal, and
  said voltage data from said specific DC power generation source, a digital pulse width modulation (PWM) module receiving
  said duty cycle signal,
  said optimum frequency signal, and
  an optimum phase signal;

said PWM module producing said control signals for said DC/DC converter;

said frequency control module producing an optimum frequency signal and said optimal duty cycle signal for said DC/DC converter;

said optimum phase signal is produced by a phase coordinator module which determines an optimum phase for each DC/DC converter based on
  said power signal for said specific DC power generation source and
  said optimum frequency signal for said DC/DC converter.

2. A system according to claim 1 wherein said multiple input stages comprises at least two input stages.

3. A system according to claim 1 wherein said DC/DC converter comprises
  a DC capacitor coupled between input nodes from said specific DC power generation source;
  a bridge inverter coupled to said DC capacitor;
  a resonant tank circuit coupled to said inverter;
  an isolating transformer coupled to said resonant tank circuit;
  a rectifier circuit coupled to said transformer;
wherein
  said bridge inverter comprises at least two switches, each of said at least two switches being controlled by signals received from said single digital controller block.

4. A system according to claim 1 wherein each DC/DC converter is controlled by said digital controller block using said controller sub-block which generates control signals for said DC/DC converter.

5. A system according to claim 1 wherein said frequency control module comprises:
  a first calculation block receiving said power signal from said MPPT module and a bus voltage, said first calculation block producing a quality factor signal;
  a second calculation block receiving said bus voltage and said voltage data to produce a gain signal;
  a look-up table block receiving
    said quality factor signal,
    said gain signal, and
    said duty cycle signal,
    said look-up table block producing said optimum frequency signal and said optimum duty cycle signal.

6. A system according to claim 1 wherein said frequency control module comprises:

a first calculation block receiving said power signal from said MPPT module and a bus voltage, said first calculation block producing a quality factor signal;

a second calculation block receiving said bus voltage and said voltage data to produce a gain signal;

a mathematical block receiving
  said quality factor signal,
  said gain signal, and
  said duty cycle signal,
  said mathematical block being for calculating and producing said optimum frequency signal and said optimum duty cycle signal.

7. A system according to claim 3 wherein said DC power generation source is a photo-voltaic (PV) module.

8. A system according to claim 3 wherein said bridge inverter is a full bridge inverter.

9. A system according to claim 3 wherein said bridge inverter is a half bridge inverter.

10. A system according to claim 3 wherein said resonant tank circuit comprises a capacitor coupled in series to an inductor.

11. A DC/DC converter circuit comprising:
  a DC capacitor coupled between input nodes from a DC power generation source;
  a bridge inverter coupled to said DC capacitor;
  a resonant tank circuit coupled to said inverter;
  an isolating transformer coupled to said resonant tank circuit;
  a rectifier circuit coupled to said transformer;
wherein
  said bridge inverter comprises at least two switches, each of said at least two switches being controlled by signals received a single digital controller block;
  said DC/DC converter circuit is controlled by a controller sub-block, said controller sub-block comprising:
    a maximum power point tracking (MPPT) module receiving current and voltage data from said DC power generation source, said MPPT module producing a reference voltage signal;
    a digital compensator module receiving said reference voltage signal and an optimal duty cycle signal, said digital compensator module producing a duty cycle signal;
    a frequency control module receiving:
      a power signal from said MPPT module for said DC power generation source,
      said duty cycle signal, and
      said voltage data from said DC power generation source,
    a digital pulse width modulation (PWM) module receiving
      said duty cycle signal,
      said optimum frequency signal, and
      an optimum phase signal;
    said PWM module producing said control signals for said DC/DC converter;
    said frequency control module producing an optimum frequency signal and said optimal duty cycle signal for said DC/DC converter;
    said optimum phase signal is produced by a phase coordinator module which determines an optimum phase for said DC/DC converter based on
      said power signal for said DC power generation source and
      said optimum frequency signal for said DC/DC converter.

12. A converter circuit according to claim 11 wherein said DC power generation source is a photo-voltaic (PV) module.

13. A converter circuit according to claim 11 wherein said bridge inverter is a full bridge inverter.

14. A converter circuit according to claim 11 wherein said bridge inverter is a half bridge inverter.

15. A converter circuit according to claim 11 wherein said resonant tank circuit comprises a capacitor coupled in series to an inductor.

16. A controller for use in controlling a DC/DC converter, the controller comprising:
   a maximum power point tracking (MPPT) module receiving current and voltage data from a DC power generation source, said MPPT module producing a reference voltage signal;
   a digital compensator module receiving said reference voltage signal and an optimal duty cycle signal, said digital compensator module producing a duty cycle signal;
   a frequency control module receiving:
      a power signal from said MPPT module for said DC power generation source,
      said duty cycle signal, and
      said voltage data for said DC power generation source,
      said frequency control module producing an optimum frequency signal and said optimal duty cycle signal for said DC/DC converter;
   a digital pulse width modulation (PWM) module receiving:
      said duty cycle signal,
      said optimum frequency signal, and
      an optimum phase signal;
   said PWM module producing said control signals for said DC/DC converter;
   wherein
      said optimum phase signal is produced by a phase coordinator module which determines an optimum phase for said DC/DC converter based on:
         said power signal for said DC power generation source and
         said optimum frequency signal for said DC/DC converter.

17. A controller according to claim 16 wherein said frequency control module comprises:
   a first calculation block receiving said power signal from said MPPT module and a bus voltage, said first calculation block producing a quality factor signal;
   a second calculation block receiving said bus voltage and said voltage data to produce a gain signal;
   a look-up table block receiving:
      said quality factor signal,
      said gain signal, and
      said duty cycle signal,
      said look-up table block producing said optimum frequency signal and said optimum duty cycle signal.

18. A controller according to claim 16 wherein said frequency control module comprises:
   a first calculation block receiving said power signal from said MPPT module and a bus voltage, said first calculation block producing a quality factor signal;
   a second calculation block receiving said bus voltage and said voltage data to produce a gain signal;
   a mathematical block receiving:
      said quality factor signal,
      said gain signal, and
      said duty cycle signal,
      said mathematical block being for calculating and producing said optimum frequency signal and said optimum duty cycle signal.

* * * * *